United States Patent
Brady

(10) Patent No.: US 11,175,083 B2
(45) Date of Patent: Nov. 16, 2021

(54) INTELLIGENT REFRIGERATION COMPRESSOR RUNTIME SCHEDULE EXTRACTION

(71) Applicant: INTERNATIONAL BUSINESS MACHINES CORPORATION, Armonk, NY (US)

(72) Inventor: Niall Brady, Donadea (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 467 days.

(21) Appl. No.: 16/182,895

(22) Filed: Nov. 7, 2018

(65) Prior Publication Data

US 2020/0141621 A1   May 7, 2020

(51) Int. Cl.
G06F 17/00 (2019.01)
F25B 49/02 (2006.01)
G06F 9/54 (2006.01)
G06N 20/00 (2019.01)

(52) U.S. Cl.
CPC ............ *F25B 49/022* (2013.01); *G06F 9/542* (2013.01); *G06N 20/00* (2019.01)

(58) Field of Classification Search
CPC .... G06F 9/4812; G06F 9/542; G06F 11/2257; G06F 11/3409; G05B 23/02; G06Q 10/06
USPC .................. 719/318; 702/182, 183
See application file for complete search history.

(56) References Cited

U.S. PATENT DOCUMENTS

| 5,231,844 | A | 8/1993 | Park |
| 6,892,546 | B2 | 5/2005 | Singh |
| 8,299,653 | B2 * | 10/2012 | Rockenfeller ............ H02P 1/30 307/130 |
| 9,140,728 | B2 * | 9/2015 | Jayanth .................... F04D 27/02 |
| 10,900,863 | B2 * | 1/2021 | Shamir ............... G01M 3/3272 |
| 2007/0089440 | A1 | 4/2007 | Singh |
| 2011/0106759 | A1 | 5/2011 | Brown |
| 2013/0188046 | A1 | 1/2013 | Kong |
| 2017/0220985 | A1 | 1/2017 | White |
| 2017/0089598 | A1 | 3/2017 | Wallace et al. |
| 2017/0365157 | A1 | 9/2017 | Shoari |
| 2018/0199386 | A1 | 1/2018 | Yuan |
| 2018/0106532 | A1 | 4/2018 | Sugar et al. |
| 2018/0123820 | A1 | 5/2018 | Kim |
| 2018/0142929 | A1 | 5/2018 | Prabhakaran |
| 2019/0056288 | A1 * | 2/2019 | Zhuge .................... G05D 27/02 |

FOREIGN PATENT DOCUMENTS

WO   2004049088 A1   11/2003

OTHER PUBLICATIONS

"Smart Refrigerator Fans Join the Internet of Things", by Lou Moffa Accelerate America/ Mar. 2017 (3 pages).

* cited by examiner

*Primary Examiner* — Andy Ho

(74) *Attorney, Agent, or Firm* — Griffiths & Seaton PLLC

(57) ABSTRACT

Embodiments for implementing intelligent refrigeration compressor runtime schedule extraction in an Internet of Things (IoT) computing environment by a processor. Compressor runtime positions of a compressor may be determined according to a single phase signal taken from an energy meter. Performance and health status of the compressor may be established according to the one or more compressor runtime activities determined from the established nominal baseload classifier.

20 Claims, 9 Drawing Sheets

INTELLIGENT REFRIGERATION COMPRESSOR RUNTIME SCHEDULE EXTRACTION

BACKGROUND OF THE INVENTION

Field of the Invention

The present invention relates in general to computing systems, and more particularly to, various embodiments for intelligent refrigeration compressor runtime schedule extraction within a refrigeration system an Internet of Things ("IoT") computing environment using a computing processor.

Description of the Related Art

In today's society, various refrigeration advances, coupled with advances in technology have made possible a wide variety of attendant benefits, such as increasing the efficiency of refrigeration systems. As computers proliferate throughout aspects of society, additional opportunities continue to present themselves for leveraging technology in refrigeration systems for improving efficiency of health and maintenance of refrigeration cabinets.

SUMMARY OF THE INVENTION

Various embodiments for extracting underlying compression runtime schedules from a single Internet of Things (IoT) enabled electrical response vector by a processor are provided. In one embodiment, by way of example only, a method/system for implementing intelligent refrigeration compressor runtime schedule extraction in an IoT computing environment by a processor. Compressor runtime positions of a compressor may be determined according to a single phase signal taken from an energy meter. Performance and health status of the compressor may be established according to the one or more compressor runtime activities determined from the established nominal baseload classifier.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
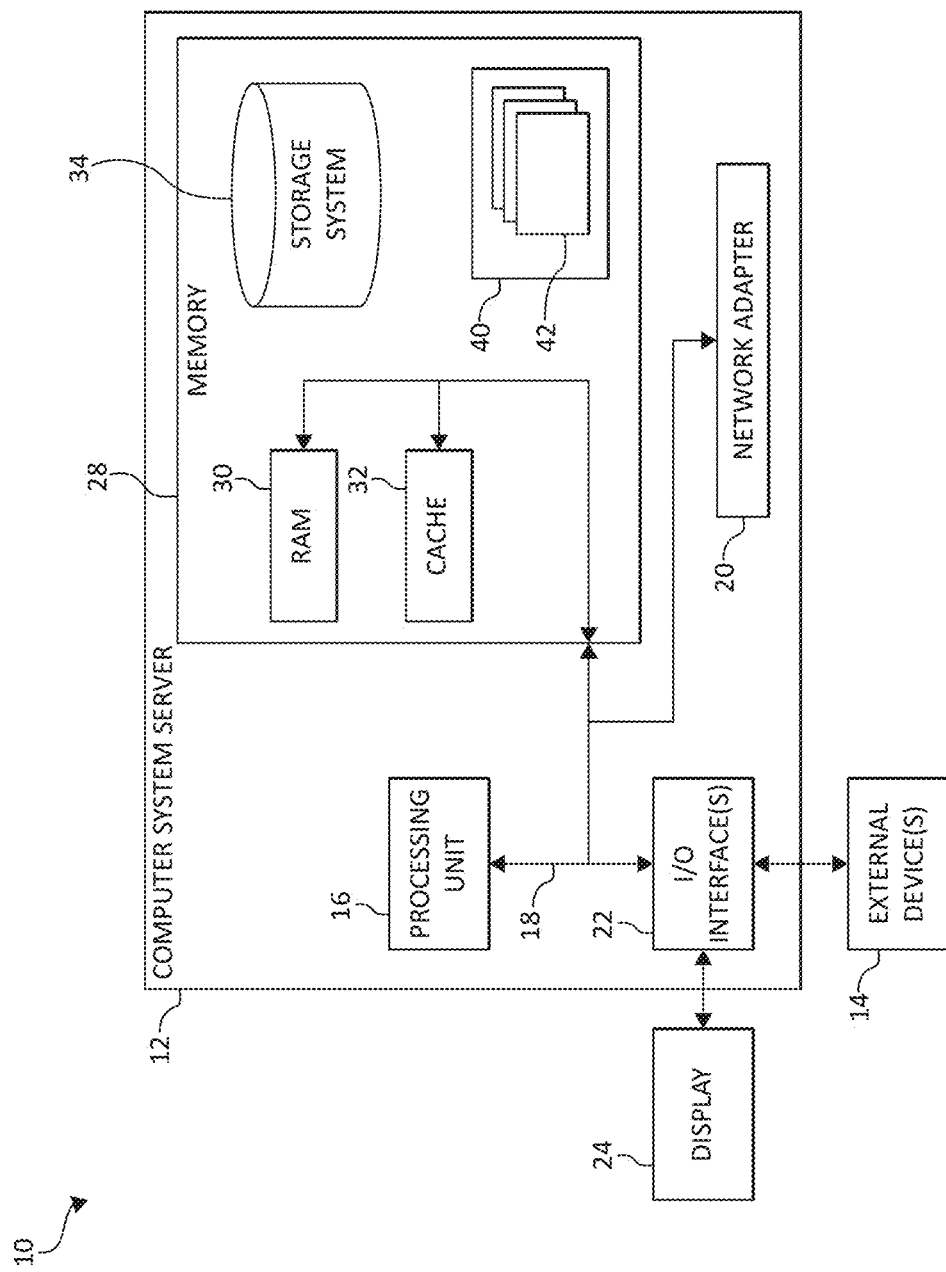
FIG. 1 is a block diagram depicting an exemplary computing node according to an embodiment of the present invention.

Refrigeration is a process of moving heat from one location to another in controlled conditions. The work of heat transport may be driven by mechanical work, but can also be driven by heat, magnetism, electricity, laser, or other means. Refrigeration has many applications, including, but not limited to: household refrigerators, industrial freezers, cryogenics, and air conditioning. Heat pumps may use the heat output of the refrigeration process, and may be designed to be reversible, but are otherwise similar to air conditioning units.

Also, a refrigeration cooling energy supply system may be referred to as a "pack" or "refrigeration pack" and may include, for example, multiple compressors to recompress refrigerant gas taken from one or more instore fridge cabinets. The packs may vary in size and composition dependent on the type and capacity of cooling energy provided and may be divided into systems such as, for example, low temperature "LT" systems for freezing (less than negative ("−") 20 degrees centigrade), and/or high temperature "HT" systems for chilling (−0 degrees centigrade). Thus, typically commercial compressors configurations operate in a pack, where the pack refers to a bank of similar and specified compressors (e.g., up to 8 units) which may be "staged in" and "staged out" of operation in an incremental manner when required to maintain loop refrigerant temperatures in normal operation based on the adopted control strategy.

Central to the provisioning of the cooling energy is the work done by the compressor in compressing the refrigerant gas, heat extracted in the condenser, and returned as a liquid once again to the in store case where it is used in turn to extract heat from the target that needs to be cooled through the evaporator. In effect, the function of the condenser in the refrigeration cycle is to extract the heat gained from the instore fridge cabinets and move the extracted heat to the outside air through the pumping of hot refrigerant gas over the condenser's efficient heat exchange capabilities. Today, most commercial refrigeration systems use a vapor compression cycle to extract heat from the system that needs to be cooled and dumps the extracted heat to the outside air. That is, the vapor compression cycle uses a circulating liquid refrigerant as the medium which absorbs and removes heat from the space to be cooled and subsequently rejects that heat elsewhere.

As the compressor accounts for 95% of the energy usage in the provisioning of cooling energy, the compressor is an obvious target for any performance assessment or optimization. For example, monitoring of compressor runtime and compressor transitions is one of the most critical sensitive response factors in establishing real-time pack performance and health status. Currently, there are various challenges for determining real-time pack performance and health status. For example, availability and access of the compressor data directly from the fridge controller is a current industry challenge because the compressor data in not readily available, or non-existent due to a myriad of reasons such as, for example, inefficient legacy hardware and non-standard communication protocols, infrastructure deficits, and the closed non-sharing industry proprietary environments. Such difficulty in obtaining the compressor data directly from the fridge controller means that application of any data driven analytics to help ascertain proper is limited or non-existent.

Also, establishing compressor runtime states is achievable by running more often in a diagnostic mode where it is still quite common to install a traditional offline data logger environment, but such an operation can be expensive by requiring a major investment of time and resources to install hardware and connect sensor banks, and which only gives the user a snapshot of pack compressor performance, which is not suited for scalable analytics deployments.

In order to overcome the challenge of accessing compressor data, the present invention provides a cost effective and an efficient implementable and scalable solution by taking a single auxiliary electrical energy signal (e.g., one minute phase current which may be a one minute mean value of the instantaneous current sampled that may be sampled every two seconds within an energy meter) from one of the phases of a refrigeration pack's 3-phase power supply energy meter. A combination of numerical methods and artificial intelligence ("AI") may be used so that in a training phase a pack nominal compressor baseload classifier may be determined. Once the pack nominal compressor baseload classifier has been established numerical methods can then be applied that when overlaid on a real-time signal it is possible to ascertain a real-time compressor runtime position, which may then be used to create a set of descriptive key performance indicators ("KPI's") that can over time be used to determine such insights such as, for example, pack compressor performance degradation trends, excessive compressor cycling, non-optimized controller strategies, pack demand anomalies, and pack load imbalances. In an additional aspect, one or more machine learning operations may be used to assist in predicting compressor failures based on the base compressor runtime assessment data over time.

In an additional example, the present invention provides for extracting underlying compression runtime schedules from a single IoT enabled electrical response vector. Said differently, a three-phrase energy meter may have 20-30 individual signals/vectors and the present invention may extract underlying compression runtime schedules using a single signal/vector. Compressor runtime positions of a refrigeration compressor may be determined according to a single phase signal of a power supply meter. Performance and health status of the compressor may be established according to the one or more compressor runtime activities.

In an additional example, the present invention provides for the establishment of an effective means of determining the real-time compressor runtime position of a retail refrigeration pack. A relevant single input signal may be detected and used to function as a proxy of actual real-time compressor start/stop activity positions such as, for example, a minute single phase RMS current captured from the power supplied to a refrigeration pack system (e.g., "RMS" or other labeling notation for the 3-phase lines).

A machine learning operation (e.g., unsupervised machine learning) may be used, coupled with numerical method algorithms, to infer a grouping without any label (e.g., to illustrate and highlight the machine learning is unsupervised) to automatically determine a nominal compressor load signal classifier (e.g., a nominal compressor classifier) for that pack. The classifier may be applied/overlaid on the real-time input signal to rebuild compressor runtime position (e.g., a minute-by minute compressor runtime position) for the pack. A subsequent descriptive analytics KPI set (e.g., a number of compressor starts per hour, a number of hourly compressor event transitions, hourly percentage of compressor on time, a number of compressors running/staged, etc.) may be built using the determined compressor runtime position that can then be used to detect compressor operational anomalies in real-time such as, for example, to 1) detect and inherent system control issues (e.g., too many compressor starts to expected normal/standard), 2) detect any inherent load supply demand mismatches (e.g., too high a pack baseload duty cycle to expected normal/standard), 3) determine an estimate of energy usage from the pack (e.g., compared to expected normal/standard).

An alert/notification (e.g., a PASS/FAIL mode) may be generated to provide a notification that allows for automatic notification of anomalous compressor behavior (e.g., in real-time—number of compressor event transitions outside of expected normal/standardized behavior). A follow-on machine learning operation may be applied on these compressor runtime and one or more KPI's may allow for the prediction of impending compressor failures in the pack (e.g., in real-time—% compressor on time increasing over time—indicator of pack losing compression efficiency due to poorly performing compressor in the pack or possible refrigerant leak).

Thus, the present invention provides for real-time monitoring by providing an effective means of assessing ongoing compressor runtime performance and at scale when compared to current one off logging operation, and in absence of proprietary compressor controller data availability. Establishing the "as is" compressor performance position allows for the identification of high cycling packs (e.g., compressors and packs considered to having extended run times when compared to their peers within the estate), where high cycling can increase energy use by 10%, and so being able to detect excessive duty cycles early that can have a significant impact on energy usage within the pack. Additionally, compressor runtime analytics and predictive maintenance of the present invention may reduce refrigeration maintenance costs by 10%-15% over current preventative maintenance and run-to-failure maintenance strategies. This reduction is achieved by early detection of process shifts, and allows for the prediction of impending equipment failure due to excessive compressor wear and tear, as well given early indicators of refrigerant leaks in the analyzed refrigeration systems.

Additional aspects of the present invention and attendant benefits will be further described, following.

In an additional aspect, as used herein, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) High degree of relevant recollection from data points (images, text, voice) (memorization and recall); and/or 13) Predict and sense with situational awareness operations that mimic human cognition based on experiences.

In general, "optimize" may refer to and/or defined as "maximize," "minimize," or attain one or more specific targets, objectives, goals, or intentions. Optimize may also refer to maximizing a benefit to a user (e.g., maximize a travel benefit). Optimize may also refer to making the most effective or functional use of a situation, opportunity, or resource.

Additionally, "optimize" need not refer to a best solution or result, but may refer to a solution or result that "is good enough" for a particular application, for example. In some implementations, an objective is to suggest a "best" combination of results, but there may be a variety of factors that may result in alternate suggestion of a combination of results yielding better results. For example, an optimization problem may search for a combination of factors that result in a minimum and/or maximum result. Thus, some changes to the variety of factors may result in a jump from one minimum/maximum to another minimum/maximum. In either case, resulting suggestions of results may be considered "good enough," "substantially optimal," and/or "sufficiently good." Herein, the term "optimize" may refer to such results based on minima (or maxima, depending on what parameters are considered in the optimization problem) for learning and improving the health and maintenance of the compressors within refrigeration systems.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, tablets, and the like).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
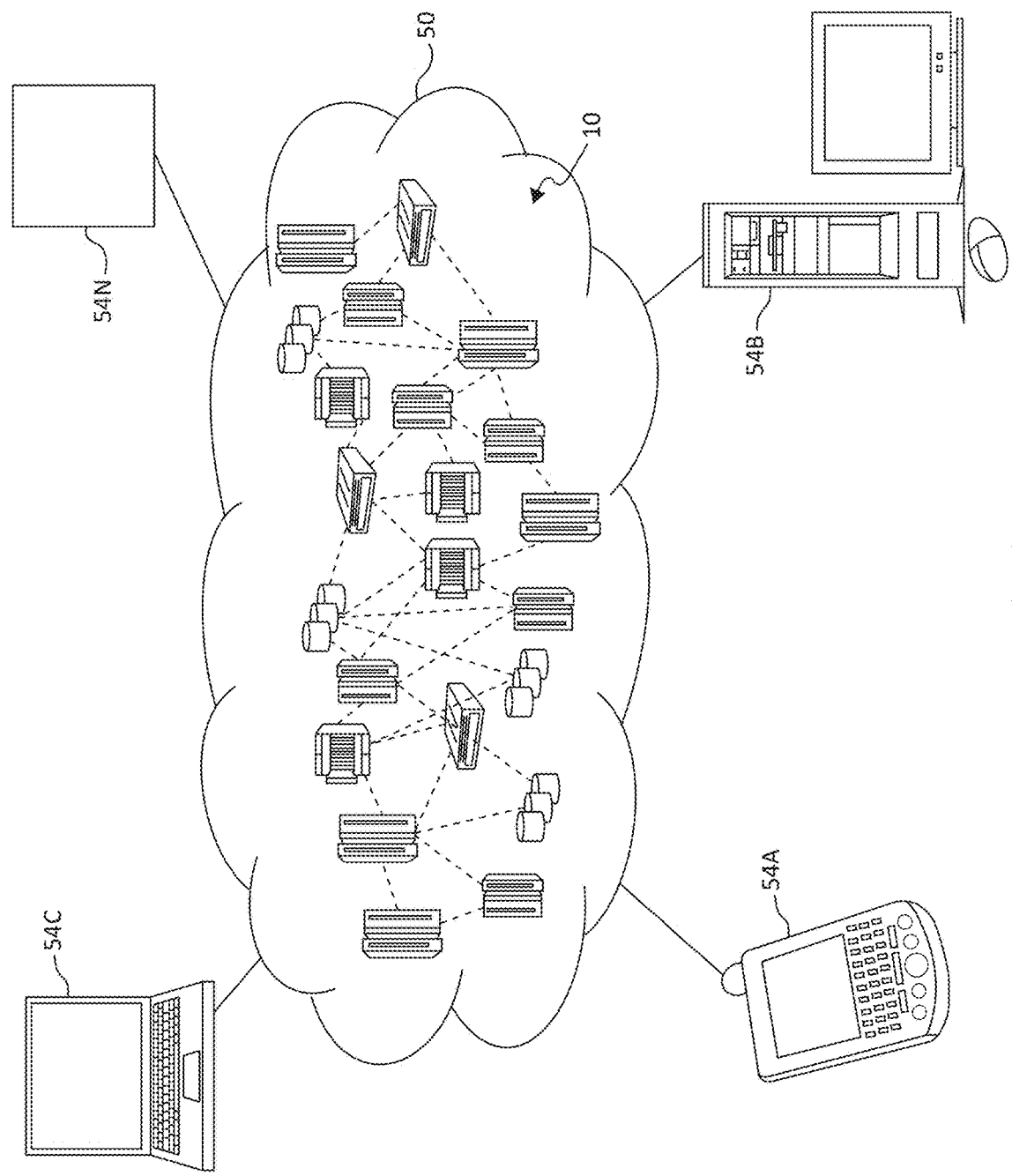
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or refrigeration pack/power supply system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
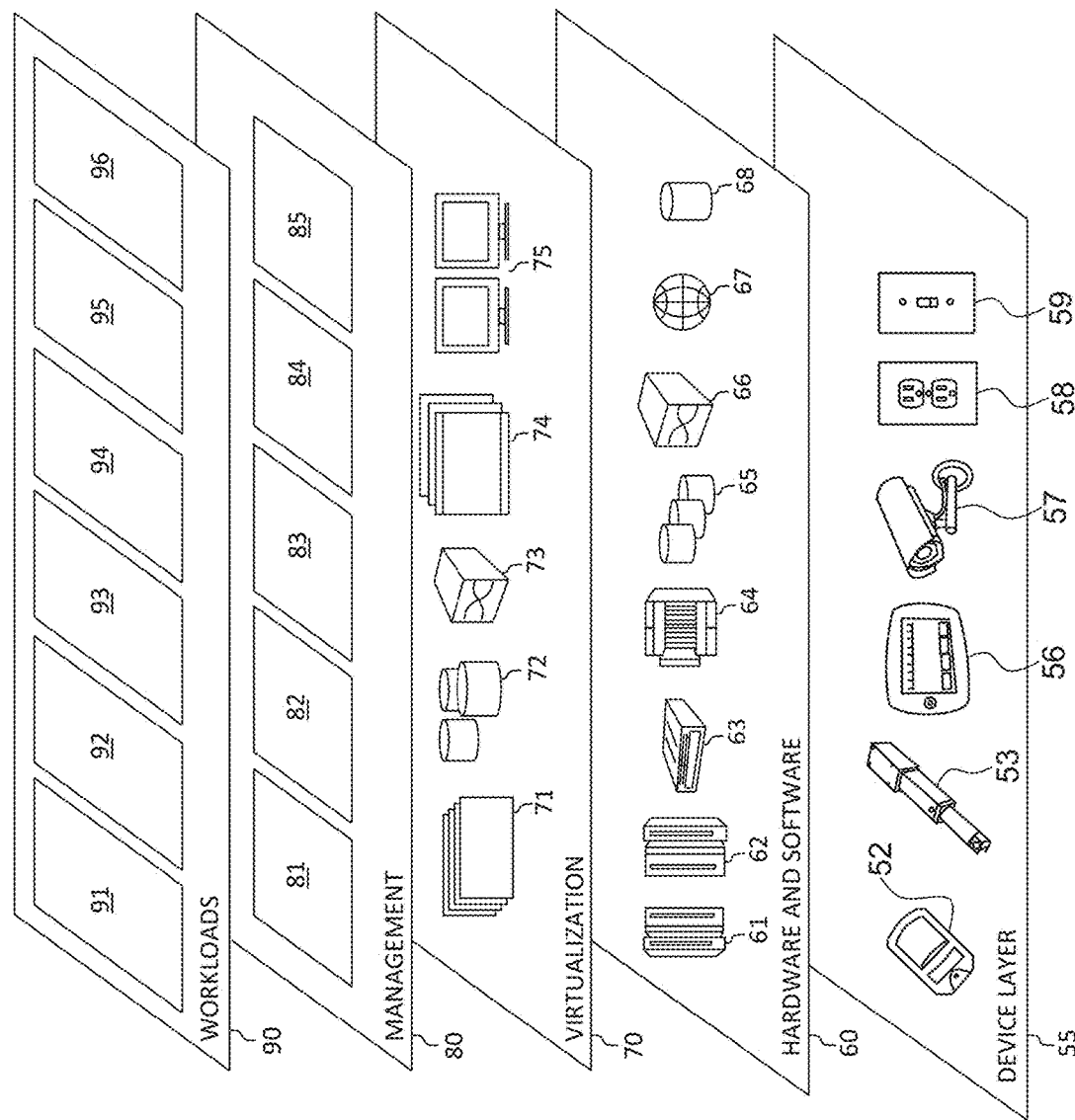
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent refrigeration compressor runtime schedule extraction within a refrigeration system an IoT computing environment. In addition, workloads and functions 96 intelligent refrigeration compressor runtime schedule extraction within a refrigeration system an IoT computing environment may include such operations as data analysis (including data collection and processing from various environmental sensors), and predictive data analytics functions. One of ordinary skill in the art will appreciate that the workloads and functions 96 for intelligent refrigeration compressor runtime schedule extraction within a refrigeration system an IoT computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mention, the mechanisms of the illustrated embodiments provide for extracting underlying compressor runtime schedules from a singly auxiliary electrical energy signal from one of the phases of refrigerator's three-phase power supply energy meter, for determining real-time compressor runtime position (e.g., loaded/unloaded) and establish performance and health status. That is, compressor runtime positions of a compressor may be determined according to a single phase signal taken from an energy meter. Performance and health status of the compressor may be established according to the one or more compressor runtime activities determined from the established nominal baseload classifier.

In one aspect, the present invention uses a single input signal that may be a proxy to actual real-time compressor start-stop activity positions and applies an unsupervised machine learning (ML) operation, coupled with numerical algorithms, to infer a grouping without any label to automatically determine the nominal compressor load signal classifier. One or more artificial intelligence ("AI") operation may be used for extracting underlying compressor runtime schedules from a single aggregated IoT enabled electrical response vector.

Figure 4:
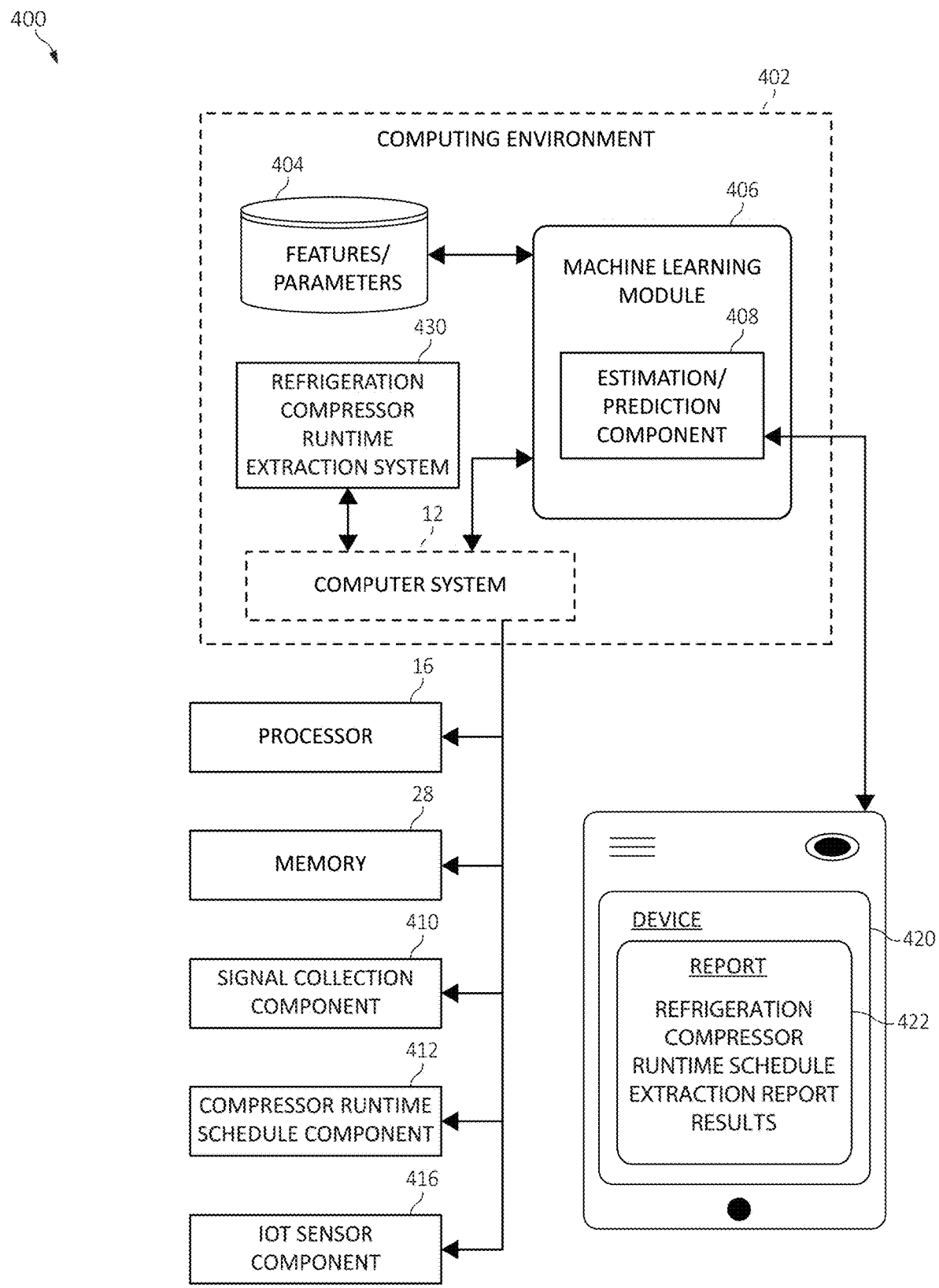
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates intelligent compressor runtime schedule extraction within a refrigeration system a computing environment, such as a computing environment 402 (e.g., an IoT computing environment), according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402 (e.g., included in a refrigeration system/unit), a refrigeration compressor runtime schedule extraction system 430, and a device 420, such as a desktop computer, laptop computer, tablet, smart phone, and/or another electronic device that may have one or more processors and memory. The device 420, the refrigeration compressor runtime schedule extraction system 430, and the computing environment 402 may each be associated with and/or in communication with each other, by one or more communication methods, such as a computing network. In one example, the device 420 and/or the refrigeration compressor runtime schedule extraction system 430 may be controlled by an owner, customer, or technician/administrator associated with the computing environment 402. In another example, the device 420 and/or the refrigeration compressor runtime schedule extraction system 430 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters 404 that is associated with a machine learning module 406, and the refrigeration compressor runtime schedule extraction system 430. The features and/or parameters database 404 may also include current and/or historical data related to compressor/refrigeration pack characteristics of each type of refrigeration system for the refrigeration compressor runtime schedule extraction system 430 and/or IoT sensor devices associated with an IoT sensor component 416. It should be noted that one or more IoT sensor devices/power supply meters may be represented as the IoT sensor component 416 may be coupled to the refrigeration compressor runtime schedule extraction system 430 (and/or a single phase line of a three-phase power supply (see FIG. 5). The features and/or parameters 404 may be a combination of features, parameters, behavior characteristics, compressor data, energy/power data, tested and validated data, or other specified/defined data for testing, monitoring, validating, detecting, learning, analyzing and/or calculating various conditions or diagnostics relating to determining/building compressor runtime schedules in the refrigeration compressor runtime schedule extraction system 430. That is, different combinations of parameters may be selected and applied to the input data for learning or training one or more machine learning models of the machine learning module 406. The one or more IoT sensors (e.g., a sensor node of a power supply meter) associated with the IoT sensor component 416 may be coupled to the refrigeration compressor runtime schedule extraction system 430.

The computing environment 402 may also include a computer system 12, as depicted in FIG. 1. The computer system 12 may also include the signal collection component 410, a compressor runtime schedule component 412, and an IoT sensor component 416 each associated with the machine learning module 406.

In one aspect, the machine learning module 406 may include an estimation/prediction component 408 for cognitively training, estimating, learning, and/or classifying refrigeration states using a single temperature sensor signal within a refrigeration system, by an IoT sensor associated with the IoT sensor component 416 located at a selected location of a refrigeration system in the refrigeration compressor runtime schedule extraction system 430.

The machine learning module 406 may collect feedback information from the one or more IoT sensors associated with the IoT sensor component 416 to learn compressor behavior, detect compressor behavior anomalies, and/or learn/predict refrigeration compressor runtime schedules. The machine learning module 406 may use the feedback information to predict operational failure of the compressor using a machine learning operation.

The signal collection component 410 may process, analyze, and/or use the collected data from the one or more IoT sensors associated with the IoT sensor component 416 that may be attached to an energy/power supply (e.g., a three-phase power supply (see FIG. 5)) to extract one or more single signals (e.g., capture an RMS phase current signal via a sensor node on an three-phase power supply (see FIG. 5 and/or refrigeration pack/power supply system 54N of FIG. 2) and communicate the data to a computing environment (e.g., a cloud computing environment such as, for example, cloud computing node 10/refrigeration pack/power supply system 54N of FIG. 2) over a selected period of time (e.g., every second).

The refrigeration compressor runtime schedule extraction system 430 determine one or more compressor runtime positions of a compressor according to a single phase signal of a power supply meter, recreate the complete performance of compressor (e.g., rebuild a compressor schedule), and/or establish performance and health status of the compressor according to the one or more compressor runtime activities.

The refrigeration compressor runtime schedule extraction system 430, in association with the compressor runtime schedule component 412, may define the single phase signal as a proxy for a compressor event detection operation.

The refrigeration compressor runtime schedule extraction system 430, in association with the machine learning module 406, may infer a clustering of compression events using a machine learning operation coupled with one or more numerical algorithms.

The compressor runtime schedule component 412, in association with the refrigeration compressor runtime schedule extraction system 430, may determine a compressor load classifier for a selected refrigeration pack. The compressor runtime schedule component 412, in association with the refrigeration compressor runtime schedule extraction system 430, may apply the compressor load classifier on the single phase signal to build the one or more compressor runtime positions for the selected refrigeration pack.

The refrigeration compressor runtime schedule extraction system 430, in association with the machine learning module 406, may detect anomalous behavior of the compressor using the compressor load classifier and/or automatically issue a notification indicating anomalous behavior of the compressor.

In one aspect, the machine learning operations of the machine learning module 406, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

The device 420 may include a graphical user interface (GUI) 422 enabled to display on the device 420 one or more user interface controls for a user to interact with the GUI 422. For example, the GUI 422 may display real-time compressor runtime schedule and/or alerts/notifications of detected compressor behavior anomalous behavior. Also, the GUI 422 may display a graph (see graphs 600 and/or 700 of FIGS. 6-7) showing results of extracting underlying compression runtime schedules from a single Internet of Things (IoT) enabled electrical response vector.

In one aspect, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
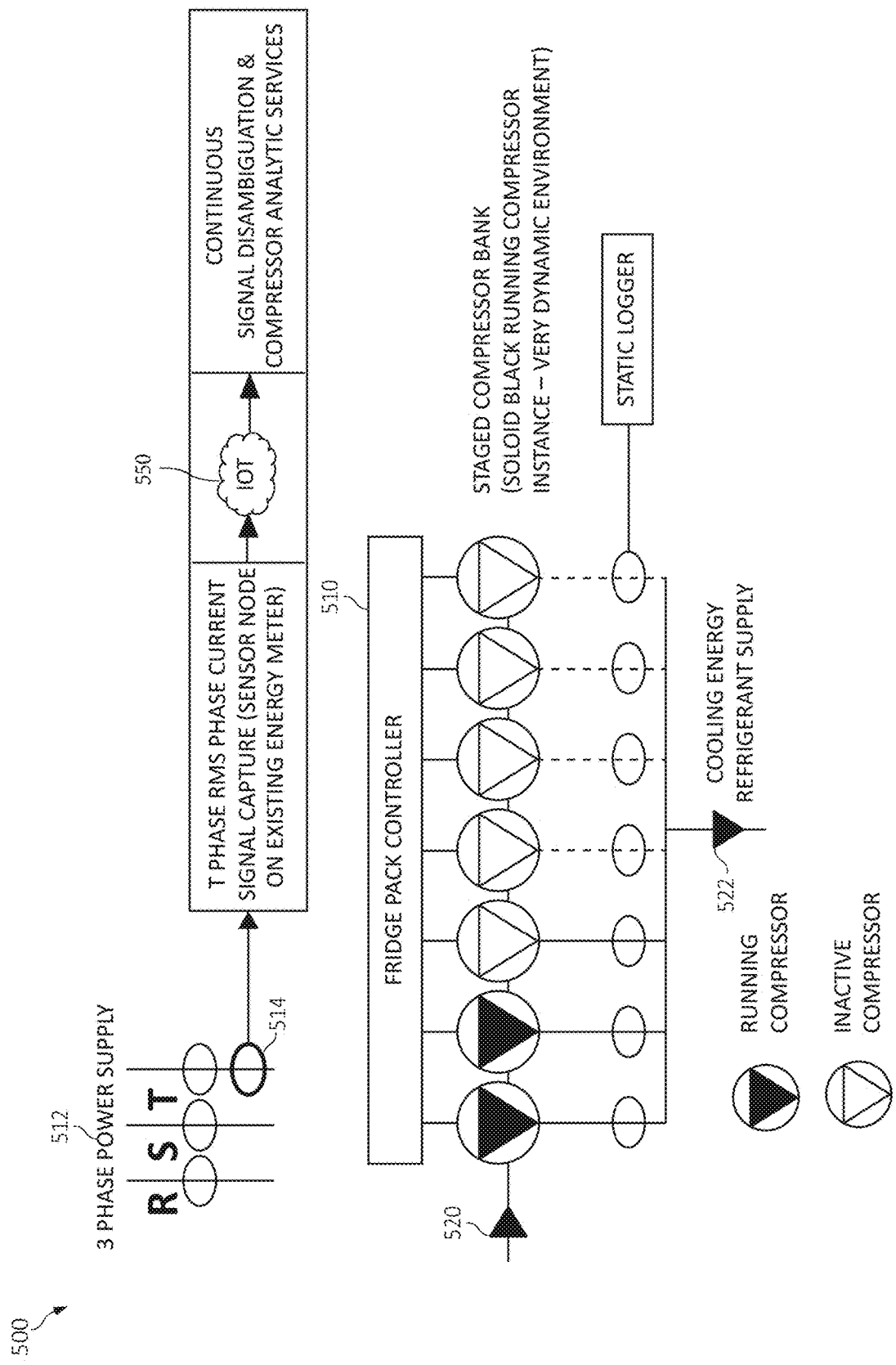
FIG. 5 is a diagram depicting a system architecture for implementing intelligent refrigeration compressor runtime schedule extraction within a refrigeration system in an Internet of Things ("IoT") computing environment.

In view of the foregoing component and functionality of FIG. 4, consider the following implementation and operation of FIG. 4 in a refrigeration system 500 in FIG. 5. For example, the functional blocks/components of functionality of FIGS. 1-4 as has been previously described may be applied and used in the refrigeration system 500 of FIG. 5.

The refrigeration system 500 may include a refrigeration ("fridge") pack controller 510, a bank of compressors 520 (e.g., with staged/active compressors and/or un-staged/inactive compressors) with a cooling energy refrigerant supply 522, and a three-phase power supply 512 (e.g., "RST," "RMS," or "L1, L2, L3", "ABC" or other labeling notation for the 3-phase lines). In operation, a single phase signal ("RMS phase current signal") (e.g., the T line of an energy/ power supply meter 514) may be used to determine one or more compressor runtime positions. Said differently, a single phase (e.g., single phase signal) may have an attached monitor (e.g., sensor node of an energy/power supply meter 514), extract one or more single signals (e.g., capture an RMS phase current signal via a sensor node on an energy/ power meter 514 and communicate the data to an IoT cloud computing environment 550) over a selected period of time (e.g., every second), and recreate the complete performance of compressor (e.g., rebuild a compressor schedule). That is, the IoT cloud computing environment 550 may provide continuous signal disambiguation and compressor analytic services using the captured RMS phase current signal via a sensor node on the energy/power supply meter 514.

In this way, the present invention provides features and functionality of current solutions by building real-time compressor schedules when underlying compressor data is unavailable. That is, the current solutions only provide for 1) querying compressor data directly through the fridge pack controller 510 and/or 2) using static data logger installation that requires individual compressor wiring both of which require direct access to underlying compressor data and does not address the challenge of building real-time compressor schedules where the underlying compressor data is unavailable.

Figure 6:
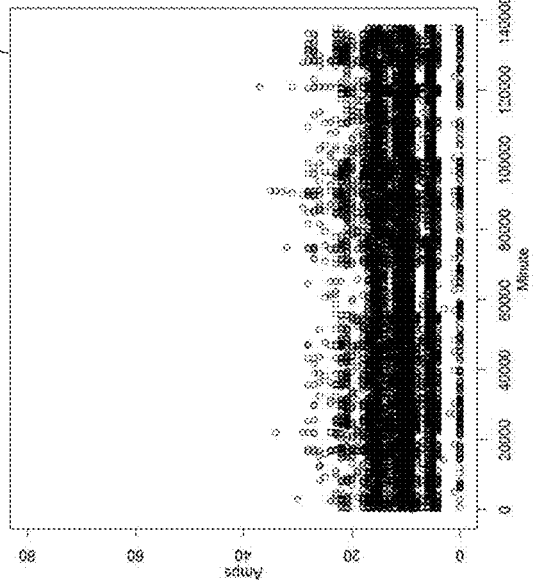
FIG. 6 is a diagram of a table and graph results from performing an unsupervised classification operation within a refrigeration system in an Internet of Things ("IoT") computing environment by a processor, in which various aspects of the present invention may be realized.

FIG. 6 is a diagram of a table 620 and graph 610 results from performing an unsupervised classification operation. That is, the capturing of a high frequency signal (1 minute sampling rate) from the pack energy meter, namely the root mean square ("RMS") current from one of the phases of the refrigeration packs' over a selected time period (one week) are depicted. An unsupervised clustering operation (e.g., k-Means algorithm) may be performed on the acquired RMS current value distribution: 1) establish clusters of different runtime compressor events in the data, and/or 2) establish a nominal baseload of a single compressor using a subsequent application of a follow on rounding algorithm. The clusters of different runtime compressor events in the data is depicted in the clustering of graph 610 and clustering results in table 620.

As depicted in table 620, a nominal pack classifier such as, for example, RMS phase current equals (=) 6 Amps "A"). That is, assuming there are staged compressors of the same size, the nominal pack classifier indicates an optimal k-clusters as 4 where the first compressor has an RMS phase current equal to 6 amps, the second compressor has an RMS phase current equal to 12 amps, the third compressor has an RMS phase current equal to 18 amps, and the fourth compressor has an RMS phase current equal to 24 amps (as the staged compressors are staged in and out. Thus, the clustering operation (e.g., k-Means algorithm) is used to perform unsupervised classification to determine a nominal pack classifier for the refrigerator pack. Using the nominal pack classifier, the present invention may apply the nominal pack classifier on the incoming single phase currents to rebuild the real-time compression runtime schedules.

Figure 7:
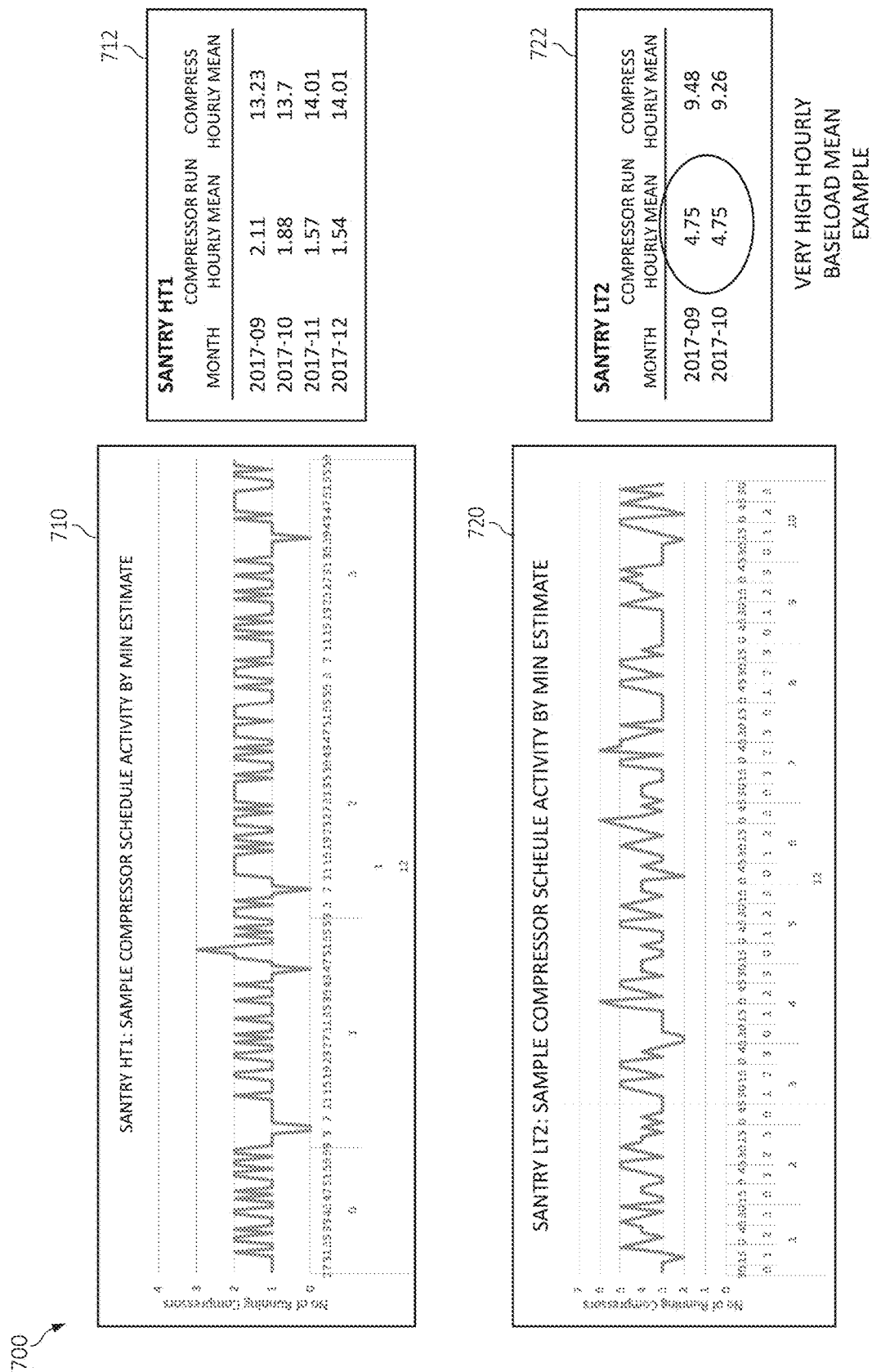
FIG. 7 is a diagram of a table and graph results from two examples of implementing intelligent refrigeration compressor runtime schedule extraction within a refrigeration pack by a processor in which various aspects of the present invention may be realized.

Turning now to FIG. 7, diagram 700 illustrates two examples of implementing an intelligent refrigeration compressor runtime schedule extraction in an IoT computing environment according to operations described herein for the present invention. That is, diagram 700 illustrates graph 710 and table 712 of a first example and graph 720 and table 722 of a second example. The first example having graph 710 and table 712 depicts a sample compressor schedule activity estimation using one minute single phase current collection using a first type of refrigeration pack in a first location (e.g., using a Santry HT1 refrigeration pack). The second example having graph 720 and table 722 depicts a sample compressor schedule activity estimation using one minute single phase current collection using a second type of refrigeration pack in a second location (e.g., using a Santry LT2 refrigeration pack). As illustrated, table 722 indicates a high hourly baseload with a 4.75 mean (indicating an excessive nominal pack load of 60% if there are 8 compressors in the pack) as compared to the pack in the first location with a mean of 2.11 with a nominal pack load of 26%.

That is, table 712 and table 722 illustrate each compressor running minute-by-minute for a selected time period (e.g., a month) showing an hourly mean value. The graphs 710 and 720 indicate on the Y-axis the number of compressors that are running and the X-axis show the amount of time (e.g., minutes/hours).

Figure 8:
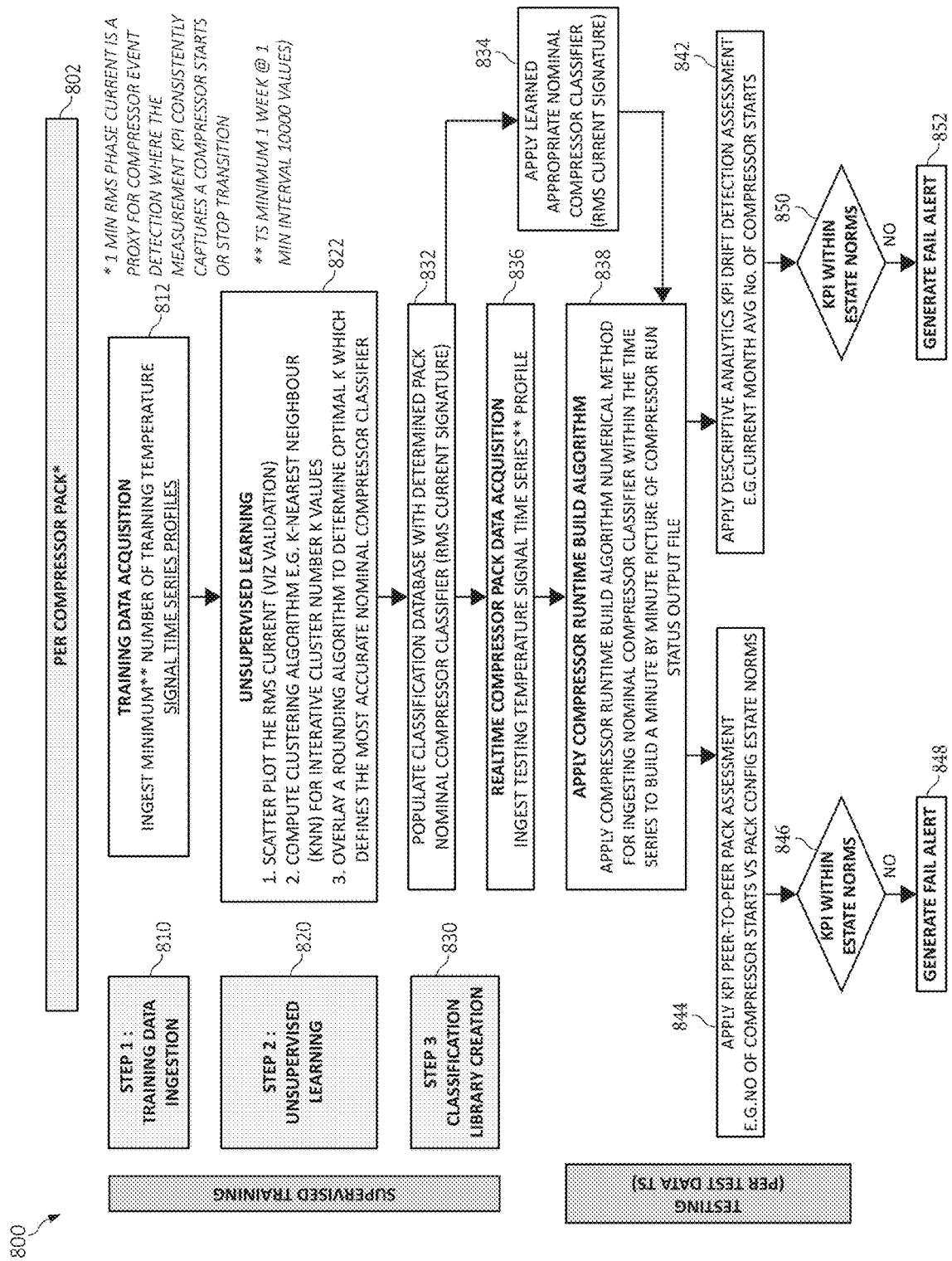
FIG. 8 is a flowchart diagram of an exemplary method for intelligent refrigeration compressor runtime schedule extraction within a refrigeration system an Internet of Things ("IoT") computing environment by a processor, in which various aspects of the present invention may be realized.

FIG. 8 is a flowchart diagram of an exemplary method for exemplary method for implementing intelligent refrigeration compressor runtime schedule extraction of a compressor in a refrigeration system by a processor. The functionality 800 may be implemented as a method executed as instructions on a machine, where the instructions are included on at least one computer readable medium or one non-transitory machine-readable storage medium. The functionality 800 may start in block 802 by data being received (e.g., "input") from one or more refrigeration systems (e.g., a refrigeration compressor pack).

In step 1), training data may be ingested and preprocessed, as in block 810. As part of step 1, training data may be acquired such as, for example, by ingesting a pack phase RMS phase current pack time and signal time series profile, as in block 812. It should be noted that a one minute RMS phase current may be a proxy for a compressor event detection where the measurement KPI consistently captures a compressor start and/or stop transition. The series signal time series profile may be a time series minimum of one week at one minute intervals (e.g., 10,000 values).

In step 2) an unsupervised learning operation may be performed, as in block 820. As part of step 2, 1) the RMS current may be validated such as, for example, by generating a scatter plot, 2) a lustering operation/algorithm (e.g., a k-nearest neighbor "KNN") may be determined for iterative cluster number k values, and 3) a rounding operation/ algorithm may be overlaid to determine an optimal "k," which defines a most/optimal accurate nominal compressor classifier, as in block 822.

In step 3), a classification library (e.g., classified library population) may be created, as in block 830. As part of step 3, a classification database may be populated with a learned/ determined nominal compressor classifier (e.g., an RMS current signature), as in block 832. From block 832, the learned/determined nominal compressor classifier may be applied (e.g., the RMS current signature). The method 800 may move from block 832 to block 838.

Alternatively from block 832, compressor pack data may be acquired/collected in real-time such as, for example, by ingesting real-time signal time series profile for a current time period (e.g., a current month), as in block 836.

It should be noted that steps 1-3 may be performed in a supervised training environment. Upon completion of the supervised training, a testing operation (per test data "TS") may be performed as follows. Once the nominal compressor load has been established in the training phase it is possible to disambiguate the test data signal to infer the number of compressors running at any moment allowing the building of a minute by minute compressor run status output file, as in block 838.

From block 838, a KPI peer-to-peer pack assessment may be applied (e.g., a number of compressor starts verse/compared to a pack configuration estate normal ("estate norms"), as in block 844. Also from block 838, descriptive analytics KPI drift detection assessment may be applied (e.g., current month average of a number "No." of compressor starts), as in block 842. From both block 842 and 844, a determination operation may be performed to determine whether compressor behavior anomalies are detected (e.g., KPIs are within estate standards/norms and standard/normal behavior may be between 20%-40% and anything greater than this is an compressor behavior anomaly, or if the number of compressor starts increase by over 10% over time then generate an alert), as in block 846 and 850. If no (e.g., compressor behavior anomalies are detected) from blocks 846 and/or 850, an alert/flag may be generated, as in blocks 848 and 852.

Figure 9:
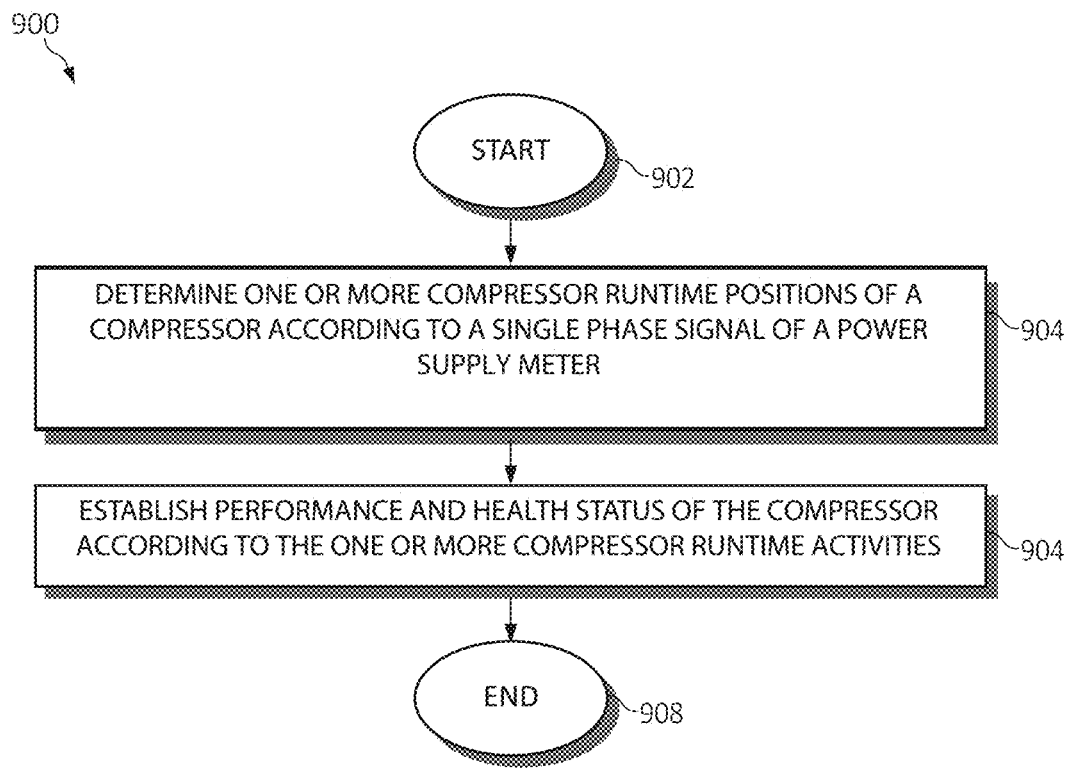
FIG. 9 is a flowchart diagram of an exemplary method for intelligent refrigeration compressor runtime schedule extraction within a refrigeration system an Internet of Things ("IoT") computing environment in accordance with aspects of the present invention.

FIG. 9 is a method 900 for implementing intelligent refrigeration compressor runtime schedule extraction in an IoT computing environment. The functionality 900 may be implemented as a method executed as instructions on a machine, where the instructions are included on at least one computer readable medium or one non-transitory machine-readable storage medium. The functionality 900 may start in block 902.

Compressor runtime schedules (e.g., positions) of a compressor may be determined according to a single phase signal of a power supply meter, as in block 904. Performance and health status of the compressor may be established according to the one or more compressor runtime activities, as in block 906. The functionality 900 may end in block 908.

In one aspect, in conjunction with and/or as part of at least one block of FIG. 9, the operations of method 900 may include each of the following. The operations of methods 900 may include defining the single phase signal as a proxy for a compressor event detection operation, inferring a clustering of compression events using a machine learning operation coupled with one or more numerical algorithms, and/or determining a compressor load classifier for a selected refrigeration pack The compressor load classifier may be applied/overlaid on the single phase signal to build the one or more compressor runtime positions for the selected refrigeration pack. The operations of methods 900 may detect anomalous behavior of the compressor using the compressor load classifier.

The operations of methods 900 may automatically issue a notification indicating anomalous behavior of the compressor, and/or predict operational failure of the compressor using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent refrigeration compressor runtime schedule extraction in an Internet of Things (IoT) computing environment by a processor, comprising:
   determining one or more compressor runtime positions of a compressor according to a single phase signal collected from one phase of a three-phase power supply meter, wherein the single phase signal is an auxiliary energy signal generated by determining a mean value of an instantaneous phase current sampled from the one phase at predetermined time intervals for a defined time period; and
   establishing performance and health status of the compressor according to the one or more compressor runtime positions.

2. The method of claim 1, further including defining the single phase signal as a proxy for a compressor event detection operation.

3. The method of claim 1, further including:
   inferring a clustering of compression events using a machine learning operation coupled with one or more numerical algorithms; and
   determining a compressor load classifier for a selected refrigeration pack.

4. The method of claim 3, further including applying the compressor load classifier on the single phase signal to infer and build the one or more compressor runtime positions for the selected refrigeration pack.

5. The method of claim 3, further including detecting anomalous behavior of the compressor using the compressor load classifier.

6. The method of claim 1, further including automatically issuing a notification indicating anomalous behavior of the compressor.

7. The method of claim 1, further including predicting operational failure of the compressor using a machine learning operation.

8. A system for implementing intelligent refrigeration compressor runtime schedule extraction in an Internet of Things (IoT) computing environment, comprising:
   one or more computers with executable instructions that when executed cause the system to:
      determine one or more compressor runtime positions of a compressor according to a single phase signal collected from one phase of a three-phase power supply meter, wherein the single phase signal is an auxiliary energy signal generated by determining a mean value of an instantaneous phase current sampled from the one phase at predetermined time intervals for a defined time period; and
      establish performance and health status of the compressor according to the one or more compressor runtime positions.

9. The system of claim 8, wherein the executable instructions further define the single phase signal as a proxy for a compressor event detection operation.

10. The system of claim 8, wherein the executable instructions further:
    infer from the clustering of compression events using a machine learning operation coupled with one or more numerical algorithms; and
    determine a compressor load classifier for a selected refrigeration pack.

11. The system of claim 10, wherein the executable instructions further apply the compressor load classifier on the single phase signal to infer and build the one or more compressor runtime positions for the selected refrigeration pack.

12. The system of claim 10, wherein the executable instructions further detect anomalous behavior of the compressor using the compressor load classifier.

13. The system of claim 8, wherein the executable instructions further automatically issue a notification indicating anomalous behavior of the compressor.

14. The system of claim 8, wherein the executable instructions further predict operational failure of the compressor using a machine learning operation.

15. A computer program product for implementing intelligent refrigeration compressor runtime schedule extraction in an Internet of Things (IoT) computing environment by a processor, the computer program product comprising a non-transitory computer-readable storage medium having computer-readable program code portions stored therein, the computer-readable program code portions comprising:
   an executable portion that determines one or more compressor runtime positions of a compressor according to a single phase signal collected from one phase of a three-phase power supply meter, wherein the single phase signal is an auxiliary energy signal generated by determining a mean value of an instantaneous phase current sampled from the one phase at predetermined time intervals for a defined time period; and an executable portion that establishes performance and health status of the compressor according to the one or more compressor runtime positions.

16. The computer program product of claim 15, further including an executable portion that defines the single phase signal as a proxy for a compressor event detection operation.

17. The computer program product of claim 15, further including an executable portion that:

infers a clustering of compression events using a machine learning operation coupled with one or more numerical algorithms;

determines a compressor load classifier for a selected refrigeration pack; and applies the compressor load classifier on the single phase signal to build the one or more compressor runtime positions for the selected refrigeration pack.

18. The computer program product of claim 17, further including an executable portion that detects anomalous behavior of the compressor using the compressor load classifier.

19. The computer program product of claim 15, further including an executable portion that automatically issues a notification indicating anomalous behavior of the compressor.

20. The computer program product of claim 15, further including an executable portion that predicts operational failure of the compressor using a machine learning operation.

* * * * *